Sept. 27, 1966 G. R. COGAR ETAL 3,276,033

HIGH PACKING DENSITY BINARY RECORDING SYSTEM

Filed June 8, 1962 2 Sheets-Sheet 1

INVENTORS
GEORGE R. COGAR
FLOYD E. ROSS

BY Edward M. Farrell
ATTORNEY

United States Patent Office 3,276,033

Patented Sept. 27, 1966

3,276,033

HIGH PACKING DENSITY BINARY RECORDING SYSTEM

George R. Cogar, Lancaster, Norwalk, Conn., and Floyd E. Ross, Warminster, Pa., assignors to Sperry Rand Corporation, New York, N.Y., a corporation of Delaware Filed June 8, 1962, Ser. No. 201,197
5 Claims. (Cl. 346—74)

This invention relates to recording systems, and more particularly to magnetic recording systems having a high packing density.

With advances in the computer art, recording of binary signals on a recording medium, such as a tape or drum, is used extensively. One such system of recording information has involved magnetically recording electrical pulse signals. In this system, the particular type of binary bit of information represented, i.e. a "0" or a "1," is determined by the direction or phase of the pulse signal that is recorded. For example, if the recorded pulse signal is positive with respect to a zero reference point, it may represent a "1." If the recorded pulse signal is negative with respect to a zero reference point, it may represent a "0."

Such pulse recording systems have included various different methods of recording. For example, in one such system a pair of pulses, in which one pulse of a positive polarity is followed by a second pulse of negative polarity, may represent a "1." Likewise, a pair of pulses having a first pulse of a negative polarity followed by a second pulse of a positive polarity, may represent a "0."

Recording of pulses to represent binary information offers numerous advantages. One such advantage is that the problem of erasing a previously recorded signal by a subsequent signal is minimized. Since the pulse signals are spaced from each other some predetermined distance on the tape drum or other recording medium, the problem of overlapping information signals is minimized.

Another advantage of recording information signals by means of pulses which are spaced with respect to each other is that the peak head current necessary to record the information may be minimized. Because such low currents may be utilized, it is not necessary to saturate the recording medium in order to record the binary information. Consequently, a much greater number of pulses may be recorded on the recording medium without interference between adjacent signals or channels.

Another advantage in the use of pulse recording for information is that the pulse time may be made very short. Therefore, the surface of the recording medium may be considered stationary under the magnetic gap at the time of writing. This results in a magnetic pulse whose flux is symmetrical about the peak.

As the amount of recorded information becomes greater, so called "self sprocketing" systems have been employed. In these systems, additional clock signals need not be recorded on the recording medium and the timing is produced by the information signals themselves. Misalignment of signals among different channels is not too critical a problem in "self sprocketing" systems.

One problem encountered in pulse recording, especially when low level signals are recorded, is that each alternate pulse recorded must be of opposite polarities. This means that the writing of two or more consecutive pulses of the same polarity is prohibited. The reason for this is that the base or reference level of the recording medium will tend to drift if the system is not returned to zero for each pulse.

In pulse recording systems used heretofore, such as the double pulse method of recording mentioned above, the recording of a "1" bit of information followed by a "0" would mean that two consecutive pulses of the same polarity would be recorded. As mentioned, this results in the undesired effect of shifting the magnetic reference level thereby prohibiting the use of pulse recording in low signal level systems.

It is an object of this invention to provide an improved system for writing binary coded signals into a recording medium.

It is a further object of this invention to provide an improved magnetic writing system in which a maximum amount of binary coded information may be recorded on a recording medium.

In accordance with the present invention, a system for recording a series of information signals is provided. The system includes means for storing and comparing two consecutive information signals. When two consecutive information signals are of the same type, an additional or correction signal is generated, with the generated pulse being of the opposite type to the consecutive similar signals. The additional signal is recorded along with the information signals.

Other objects and advantages of the present invention will be apparent and suggest themselves to those skilled in the art to which the present invention is related, from a reading of the following specification and claims in conjunction with the accompanying drawings, in which:

Figure 1:
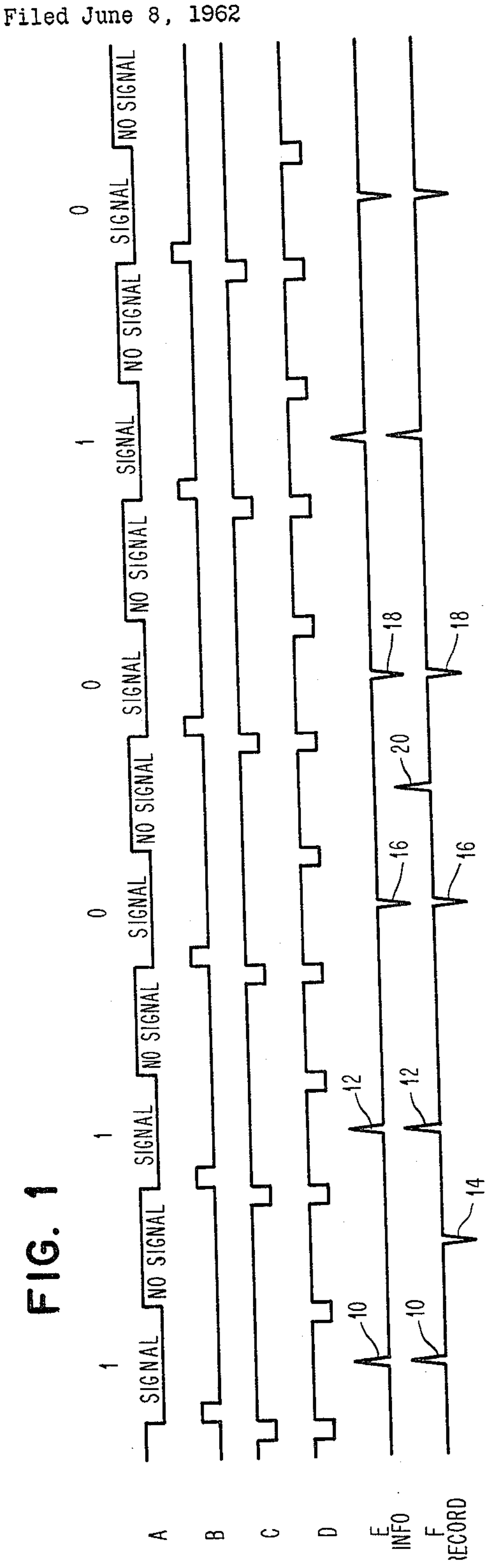
FIGURE 1 illustrates a series of waveforms, shown for the purpose of explanation.
Figure 2:
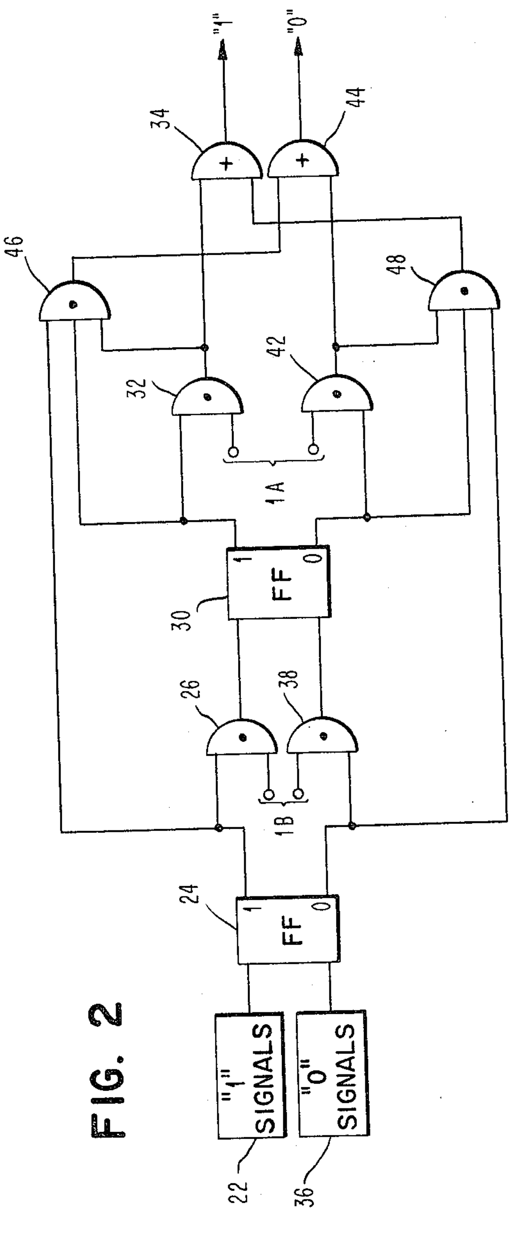
FIGURE 2 is a block diagram illustrating the present invention.

Referring to FIGURES 1 and 2 of the drawing, assume that a series of informatiton signals 110010 is to be recorded. The information to be recorded may be represented by pulses illustrated in the waveform 1D. It is noted that in this waveform that the "0" type of information is represented by a negative pulse and the "1" type of information is represented by a positive pulse.

The pulses illustrated in waveform 1E actually represent the information pulses which are applied to a recording head in a write system. However, in the prior stages of a system, the "0" information may actually be represented by the absence of a pulse. In this case, the absence of a pulse, through appropriate circuitry, may be used to create the negative pulses representing "0."

In the explanation of FIGURE 2, it is understood that various timing signals within the computer system control the timing of the information signals. These timing signals are not illustrated in FIGURE 2 for purposes of clarity.

The waveform 1F illustrates the total number of pulses which are recorded at a recording head. Pulses in addition to those representing information are included. These additional or correction pulses occur between two consecutive similar types of information. For example, between the positive information pulses 10 and 12, a negative pulse 14 is recorded. Likewise, between the negative information pulses 16 and 18, positive pulse 20 is recorded. It is noted that no correction pulses are generated between the information pulses when the consecutive information pulses are of opposite types, i.e. a "1" followed by a "0," or a "0" followed by a "1."

Before considering the generation of the correction pulses, first consider how the information is recorded when no such correction pulses are involved. If a "1" bit of information is to be recorded, a signal from an information source 22 is applied to set a flip-flop circuit 24. The "1" output terminal of the flip-flop 24 is switched to a low state with the output signal therefrom being applied to a negative inverting AND gate 26. A signal represented by waveform 1B is also applied to the AND gate 26. The latter signal, being in a low state during most of the signal period, permits the "1" bit of information to be applied through a delay circuit to set a second flip-flop 30. A delay time, which may extend up to one digit period, exists between the operations of the flip-flops 24 and 30.

The output signal from the flip-flop 30 is applied to a negative inverting AND circuit 32. A form of gating signal, represented by the waveform 1A, is also applied to the AND gate circuit 32. The output signal from the AND gate circuit 32, developed when two low input signals are applied thereto, is applied to an OR gate circuit 34. The output signal from the OR gate circuit 34, represented by a positive pulse, may then be applied to a recording head to record information on a recording medium, such as tape or a drum.

Consider now the recording of a "0" bit of information. In this case, a signal is produced by the "0" signal source 36 to reset the flip-flop 24. The "0" output side of the flip-flop 24, being in a low state during its reset condition, is connected to a negative inverting AND gate circuit 38. Again, the gating signal represented by the waveform 1B, is applied to the AND circuit 38 to permit "0" information to reset the flip-flop 30 placing it in the "0" state.

The output from the flip-flop 30 representing "0" information, is applied to a negative inverting AND gate circuit 42. Again, a gating signal represented by a waveform 1A, is also applied to the AND gate circuit 42. An output signal from the AND gate circuit 42 is developed when both input signals are low with this output signal representing "0" information. The output signal from the AND gate 42 is applied to an OR gate 44, which may then be applied to a recording head for recordation on a recording medium, such as a tape or drum.

Thus, it is seen that in order to record "1" information that the input signal follows a path from the source 22, through the flip-flop 24, the AND circuit 26, the flip-flop circuit 30, the AND gate circuit 32, the OR gate circuit 34, and finally to the recording head. Likewise, "0" input information signal passes from the source 36, through the flip-flop 24, the AND gate circuit 38, the flip-flop 30, the AND gate circuit 42, the OR gate circuit 44 and finally to the recording head.

Let us now consider the generation of the correction signals which occur with two consecutive information signals of the same type. If two information signals, for example, represented by pulses 10 and 12 in waveform 1E, are to be recorded, the correction pulse 14, represented by waveform 1F, will also be generated and recorded. It was seen that a "1" bit of information from the source 22 is first stored in the flip-flop circuit 24. The stored information from the flip-flop 24 is passed to the second flip-flop 30 after a delay. Thus, when a second "1" bit of information is applied from the source 22 to the flip-flop 24, the first "1" bit of information will be stored in the flip-flop circuit 30. In this situation, it is now necessary to record an additional correction pulse which has a "0" characteristic.

The "1" output sides of the two flip-flops 24 and 30, being in a negative or low condition, are connected to a negative inverting AND gate circuit 46. It is noted that the output signal from the AND gate 46 is connected to the OR gate circuit 44 which is used to pass "0" bits of information. It is also noted that the output from the AND circuit 32 is also applied to the input circuit of the AND gate circuit 46. Thus it is seen that the three input signals to the AND gate circuit 46 must all be low in order to produce an output signal which will cause a signal having "0" characteristics to be recorded.

Referring to waveform 1A, to illustrate the nature of the signal applied to the AND gate 46, it is noted that a digit period may be represented by one complete cycle of a waveform 1A. One-half of the cycle, representing one-half of the digit period, is indicated as being the significant portion of the cycle. This is the time allotted to record true information. The second half of the waveform, designated as non-significant, is the time alloted to record the correction pulses, if any, which do not actually represent true information.

Referring back to the flip-flops 24 and 30 when they are storing "1" bits of information in explaining the generation of correction signals, the signal represented by the waveform 1A is high during its non-significant portion. The output signal level at the AND gate 32 is therefore low. The low output signal from the AND gate 32 may therefore be considered as a gating signal to permit a pulse to be generated at the output circuit of the AND gate circuit 46 when the "1" sides of both flip-flops 24 and 30 are low. As previously mentioned, in a particular embodiment of the present invention, all the AND gate circuits illustrated are known as negative inverting AND gates. This means that only if all the input signals are low or negative, then the output signal will be high or positive.

When the flip-flops 24 and 30 are both storing "1" bits of information, their "1" output sides will both be in the low state. When the signal represented by waveform 1A is applied to the AND gate circuit 32 and is in its non-significant portion of the cycle, this means that a high input signal is applied to the AND gate 32. In this case, the output from the AND gate circuit 32 is low. Thus the three signals applied to the AND gate circuit 46 are all low to cause a correction pulse signal to be generated and passed through the OR gate circuit 44 to cause a pulse signal having a "0" characteristic to be recorded.

A similar situation results when two consecutive information signals are "0." In this case, both flip-flops 24 and 30 will store "0" bits of information. The "0" output sides of both flip-flops will therefore be in a low condition. The "0" outputs from the flip-flops 24 and 30 are applied to a negative inverting AND gate 48. When the output level from the AND gate 42 is also low, as it is during the non-significant pulse period, the AND gate 48 develops a pulse which is applied to the OR gate 34 thereby causing a correction signal having a "1" characteristic to be recorded.

It is seen that during the non-significant portion of the signal, represented in waveform 1A, that the output voltage level from both the AND gates 32 and 42 are low. During the significant phase, the output level from one of the gate circuits 32 or 42 will be high thereby inhibiting the passage of signals through one of the AND gates 46 or 48. The other AND gate not inhibited by the output signal level from the AND gate 32 or 42 will be inhibited during the significant phase by the output signal level from the flip-flop circuit 30.

Let us now consider a situation where a "1" bit of information is followed by a "0" bit. In this case, the flip-flop 30 will store a "1" and the flip-flop 24 will store a "0" during the non-significant period. Since the "1" output side of the flip-flop 24 is high, no signals will pass through the AND gate circuit 46. Likewise, since the "0" output side of the flip-flop 30 is also high, no signals will pass through the AND gate 48.

In like manner, if a "0" bit of information is followed by a "1" bit, the flip-flop 30 will store a "0" and the flip-flop 24 will be storing a "1" during the non-significant period. In this case, the "0" side of the flip-flop 24 will be high to inhibit the passage of any signals through the AND gate 48. Also, the "1" side of the flip-flop 30 will be high to prevent the passage of any signal through the AND gate 46.

Thus it is seen that when one signal is followed by a second signal of a different characteristic that no addditional or correction pulses are recorded. The reason for this is that neither of the AND gates 46 or 48 will develop an output signal when the consecutive information signals are of different characteristics.

However, when two consecutive signals are of the same characteristic, one or the other of the AND gate circuits 46 or 48 will generate a signal at its output. The developed signal is passed through one of the OR gates 34 or 44 to cause a correction or additional signal to be recorded. The correction pulse, as mentioned, is of the opposite type than the two consecutive information signals.

Also, it is noted that the information is recorded during the significant phase of the signal period and the correction pulses are recorded during the non-significant phase of the signal period.

It may be observed that the system always returns to a point of reference, since no two recorded pulse signals are of the same polarity. A greater degree of "packing" is therefore possible in utilizing the present invention. One reason for this is that low level signals may be recorded without the likelihood of signals from one channel overlapping signals from an adjacent channel or previous or subsequent recorded signals appearing in the same channel.

Figure 3:
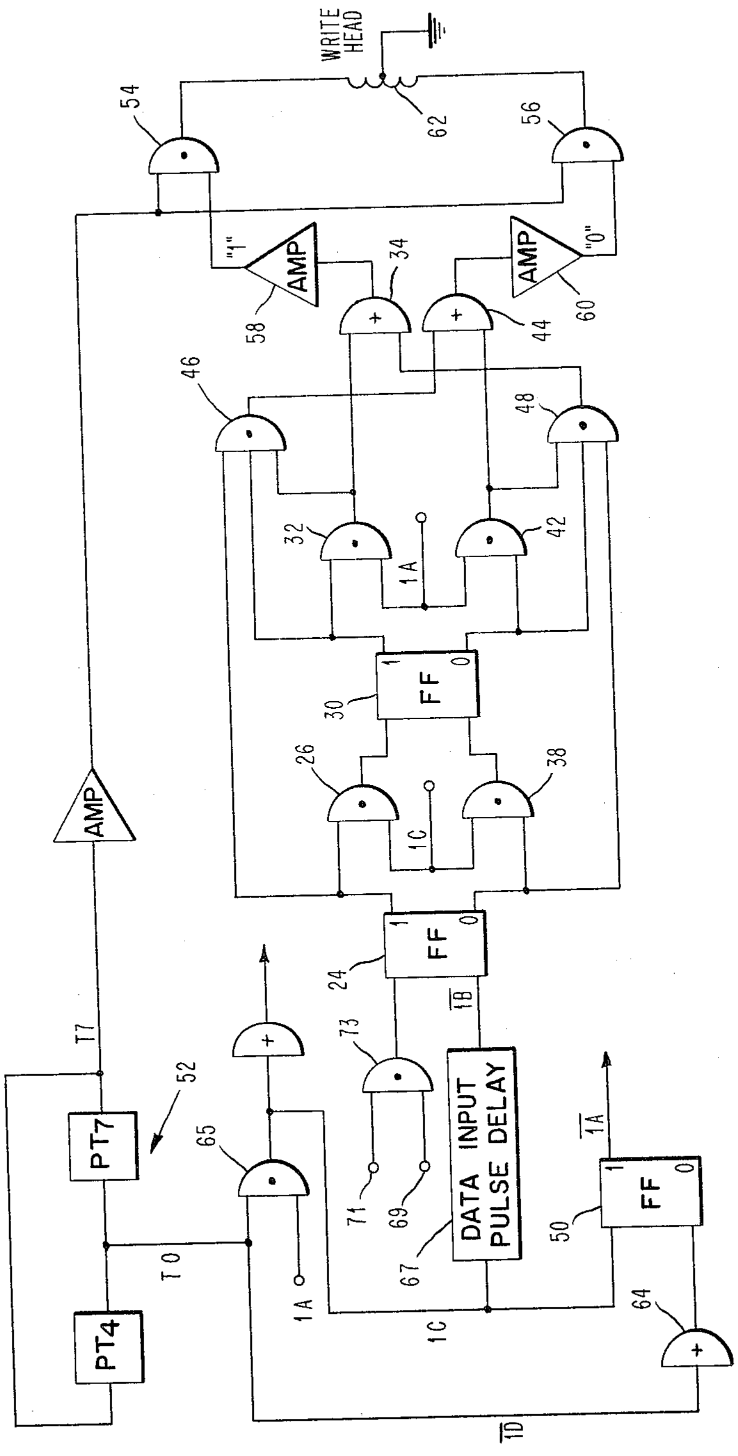
FIGURE 3 is a block diagram illustrating a system incorporating the present invention.

Referring particularly to FIGURE 3, a more complete system as used in a computer is illustrated. In the system illustrated, the writing of two or more consecutive pulses of the same polarity is avoided through the utilization of the present invention.

The flip-flop 24 is synchronized with the computer time. It changes state only during the clock time and has a one pulse time delay. The flip-flop 30 is asynchronous and it changes state when there is an input pulse. Between the input and output signal from the flip-flop 30, there is no one pulse delay. In order to differentiate data and correction pulses, a phase control counter 50 is provided. When the counter 50, in the form of a flip-flop circuit, is in the "1" state, it is in the significant phase of the signal period as illustrated in waveform 1A of FIGURE 1. During this significant phase, data or information pulses are written. When the counter 50 is at the "0" state, it is in the non-significant phase of the signal period as illustrated by waveform 1A. During this phase, correction pulses are written as needed. It is noted that the "1" output side of the counter 50 is connected to the AND gate circuits 32 and 42, which were described in connection with FIGURE 1.

The two phases of the counter 50 alternate with each other with a duration of 11 pulse times per phase in a preferred embodiment of the present invention. The 11 pulse time basic cycle is established by a dynamic shift register 52. The shift register 52 may be 11 bits of length with two output taps, one at T0 and the other at T7 of the 11 pulse time cycle. This particular method of obtaining a write clock was chosen to provide synchronization with the main control unit clock as used in a computer system. Of course, the 11 pulse time cycle is only illustrative and the actual number is dependent upon the particular computer system involved.

A bit coincidence with the initial clearance of the system is inserted in the register 52 (not illustrated). At every T7 of the 11 pulse time cycle, a signal is sent to a pair of AND gates 54 and 56. At this time, signals are received by the AND gates 54 and 56 from the switch line drivers 58 and 60, respectively, to cause information to be applied to a coil 62 which serves as part of the write head in a recording system. In other words, every 11 pulse time interval, either a data or correction pulse may be recorded.

Only one channel of a computer system is illustrated in FIGURE 3. The total number of pulse time intervals per digit period, it may be seen, is twenty two.

At every T0 of the 11 time pulse cycle, the counter 50 is stepped by a signal from the OR gate 64 which controls or resets the counter 50 to produce the signal represented by waveform 1A. The signal controlling the counter 50, illustrated in waveform 1D, occurs every 11 pulse time intervals.

The pulse signal, illustrated by waveform 1D, occurring every 11 pulse time is applied to an AND gate circuit 65 to produce a pulse signal represented by waveform 1C. It is noted that the signal represented by waveform 1A must be high to produce the signal of waveform 1C which occurs every digit period.

The signal represented by waveform 1C is used to perform three functions. First, it is applied to set the flip-flop or counter 50 to initiate the significant phase of the signal represented by waveform 1A. Second, it is applied to the AND gates 26 and 38 to permit the transfer of stored data from the flip-flop 24 to flip-flop 30. Third, it goes through a one pulse time delay through a delay circuit 67 to produce the signal of waveform 1B, which in turn is used to clear or reset the flip-flop 24.

Timing pulses are applied to the AND gate 71 through the input terminal 71, along with the information or data, which is applied to the input terminal 69. In this particular system, a "1" is represented by the presence of a pulse signal and a "0" is represented by the absence of a pulse signal. This is somewhat different than the arrangement illustrated in FIGURE 1, wherein the "1's" and "0's" were both represented by the presence of signals. However, the subsequent operation relating to the present invention is the same in both cases. It is noted that the flip-flop 24 is reset by the signal from the delay circuit 67. If there is no output from the AND gate 73, signifying "0" information, the flip-flop 24 will remain reset and may be considered as storing "0" information.

Details regarding the entire system as illustrated in FIGURE 3 are omitted for purposes of clarity since the entire system is only incidentally related to the present invention, which involves only the generation of correction pulses. For example, the system involved may include circuitry for receiving twenty seven bit words in three bit parallel modes and dispersing these words in a format of three nine-bit frames. Only one channel for recording information is illustrated by FIGURE 3.

The embodiments of the invention in which an exclusive property or privilege is claimed are defined as follows:

1. In a system for recording a series of information signals of two characteristically different types onto a record medium with said series including first and second information signals separated in time by one digit period, the combination comprising first and second storage circuits, means for applying said first and second information signals to said first storage circuit, means for applying the information stored in said first storage circuit to said second storage circuit whereby said first information signal is stored in said second storage circuit at the same time that said second information signal is stored in said first storage circuit, and means for comparing the information stored in said first and second storage circuits and generating an additional signal between said first and second information signals, means for recording said additional signal on a non-information bearing area of said record medium each time said first and second storage circuits are storing the same type of information signals.

2. A system for recording a series of information pulses of either a first or second charatceristically different type on a record medium, said first signal being represented by a pulse of a first polarity with respect to a point of reference, said second type signal being represented by a pulse of a second polarity with respect to said point of reference potential, a pair of flip-flop circuits for storing two consecutive information pulses, means for comparing the information stored in said pair of flip-flop circuits and generating an additional pulse signal between two consecutive information pulses each time said pair of flip-flop circuits are storing two consecutive pulses of the same type, said additional pulse signal being of the opposite type to said consecutive pulses, and means for recording said additional pulse along with said information pulses on a non-information area of said record medium, with said additional pulse signal being recorded between consecutive pulses of the same type.

3. A recording system for recording "0" and "1" bits of information on a record medium wherein said "0" bit is represented by a signal of a first characteristic and said "1" bit is represented by a signal of a second characteristic comprising a source of information including said "0" and "1" bits of information separated in time by one digit period, a pair of storage circuits, means for applying information signals from said source to the first of said storage circuits, a recording element, means for applying output signals from the second of said storage circuits to said recording element to record said information signals, an AND gate, means for applying the stored signals from said pair of storage circuits to said AND gate to generate a correction output signal between two consecutive bits of information each time the information signals stored by said pair of storage circuits are of the same characteristic, no correction signal being generated when the information stored in said pair of storage circuits are not of the same characteristic, and means for applying said correction signal to said recording element, said correction signal being recorded on a non-information area of said record medium between consecutive bits of information of the same characteristic.

4. A system for recording "0" and "1" bits of information on a record medium wherein said "0" bit is represented by a signal of a first characteristic and said "1" bit is represented by a signal of a second characteristic comprising a source of information including said "0" and "1" bits of information being separated in time by one digit period, a first storage circuit, means for applying information signals from said source of information to said first storage circuit, a second storage circuit, means for applying a stored signal from said first storage circuit to said second storage circuit, a recording head, means for applying output signals from said second storage circuit to said recording head to record said information signals onto said record medium, a comparison network including an AND gate circuit, means for applying the stored signals from said first and second storage circuits to said comparison network to generate a correction output signal between two consecutive information signals each time the information signals stored by said first and second storage circuits are of the same characteristic, with no correction signal being produced when the information stored in said first and second storage circuits are not of the same characteristic, and means for applying said correction signal to said recording head and recording said correction signal on a non-information bearing area of said record medium between two information signals of the same characteristic.

5. A recording system for recording "0" and "1" bits of information on a record medium wherein said "0" bit is represented by a signal of a first polarity and said "1" bit is represented by a signal of a second polarity comprising a source of information including said "0" and "1" bits of information being separated in time by one digit period, a first flip-flop circuit, means for applying said bits of information signals from said source to said first flip-flop circuits, a second storage circuit, means for applying a stored signal from said first flip-flop circuit to said second flip-flop circuit through said delay circuit, recording means, means for applying output signals from said second flip-flop circuit to said recording means to record said bits of information, a comparison network including an AND gate, means for applying the stored information from said first and second flip-flop circuits to said comparison network to generate a correction output signal between two consecutive bits of information signals each time the bits of information stored by said first and second flip-flop circuits are of the same polarity, with no correction signal being produced when the bits of information stored in said first and second flip-flop circuits are not of the same polarity, and means for applying said correction signal to said recording means to record said correction signal on a non-information bearing area of said record medium between two bits of information of the same polarity.

References Cited by the Examiner

UNITED STATES PATENTS

| | | | |
|---|---|---|---|
| 2,609,143 | 9/1952 | Stibitz | 235—153 |
| 3,031,646 | 4/1962 | Reinhaltz | 340—146.1 |

BERNARD KONICK, *Primary Examiner.*

IRVING SRAGOW, *Examiner.*

R. McCLOSKEY, P. F. ROTH, *Assistant Examiners.*